(12) United States Patent
Osaka

(10) Patent No.: US 8,059,430 B2
(45) Date of Patent: Nov. 15, 2011

(54) HIGH EFFICIENCY DC-DC CONVERTER FOR REDUCED SWITCHING LOSS

(75) Inventor: Shohei Osaka, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 473 days.

(21) Appl. No.: 12/393,650

(22) Filed: Feb. 26, 2009

(65) Prior Publication Data

US 2009/0231883 A1    Sep. 17, 2009

(30) Foreign Application Priority Data

Mar. 17, 2008   (JP) .................................. 2008-067821

(51) Int. Cl.
*H02M 3/335* (2006.01)
(52) U.S. Cl. ..................................................... 363/21.02
(58) Field of Classification Search ......... 363/20–21.03; 323/270, 271
See application file for complete search history.

(56) References Cited

U.S. PATENT DOCUMENTS

| | | | |
|---|---|---|---|
| 6,788,556 B2 * | 9/2004 | Hosotani et al. ............ 363/21.15 |
| 7,339,799 B2 | 3/2008 | Osaka et al. | |
| 2003/0111982 A1 * | 6/2003 | Watanabe ...................... 323/225 |
| 2007/0007933 A1 * | 1/2007 | Chan et al. ..................... 323/235 |
| 2007/0159865 A1 * | 7/2007 | Iwamoto et al. ................. 363/95 |
| 2007/0171680 A1 * | 7/2007 | Perreault et al. ................ 363/16 |
| 2007/0274105 A1 * | 11/2007 | Osaka .......................... 363/21.02 |
| 2008/0036435 A1 * | 2/2008 | Watanabe et al. .............. 323/271 |
| 2008/0316775 A1 * | 12/2008 | Tsai et al. ................... 363/21.01 |

FOREIGN PATENT DOCUMENTS

JP    2000-78836    3/2000

* cited by examiner

*Primary Examiner* — Jeffrey Sterrett
*Assistant Examiner* — Gary Nash
(74) *Attorney, Agent, or Firm* — Oblon, Spivak, McClelland, Maier & Neustadt, L.L.P.

(57) ABSTRACT

A DC-DC converter includes: a first series circuit in which a resonance reactor, a primary winding of a transformer, and a switching element are connected in series, the first series circuit being connected to both ends of a direct current power supply; a second series circuit in which a first rectifier, a current resonance capacitor, and a secondary winding of the transformer are connected in series, the second series circuit being connected to both ends of the direct current power supply; a rectifying/smoothing circuit having a second rectifier and a smoothing capacitor and connected to both ends of a series circuit of the current resonance capacitor and the secondary winding of the transformer; an output voltage detection circuit that detects an output voltage of the rectifying/smoothing circuit; and a control circuit that turns on and off the switching element based on an output voltage signal from the output voltage detection circuit.

14 Claims, 8 Drawing Sheets

HIGH EFFICIENCY DC-DC CONVERTER FOR REDUCED SWITCHING LOSS

BACKGROUND OF THE INVENTION

1. Field of the Invention

The present invention relates to a high efficiency DC-DC converter in which a switching loss of a switching element is reduced.

2. Description of the Related Art

A conventional DC-DC converter shown in FIG. 1 includes: a direct current power supply Vin; a first series circuit that is composed of a step-up reactor L1 and a switching element Q0 composed of a MOSFET or the like and is connected to both ends of the direct current power supply Vin; a rectifying/smoothing circuit that is composed of a rectifier (diode) D1 and a smoothing capacitor Co and is connected in parallel to the switching element Q0; an output voltage dividing series circuit that is composed of a first resistor R1 and a second resistor R2 and is connected in parallel to the smoothing capacitor Co; and a control circuit 10a that controls ON/OFF of the switching element Q0 based on a divided voltage of the first resistor R1 and the second resistor R2.

A description will be made of operations of the conventional DC-DC converter of FIG. 1 while referring to operation waveforms of the respective portions, which are shown in FIG. 2. In FIG. 2, Vo indicates a both-end voltage of the smoothing capacitor Co, $I_{L1}$ indicates a current flowing through the step-up reactor L1, $I_{D1}$ indicates a current flowing through the rectifier D1, $I_D$ indicates a drain current of the switching element Q0, $V_{DS}$ indicates a drain-source voltage of the switching element Q0, and Vg indicates a gate drive signal of the switching element Q0.

First, in a period TM1, when the switching element Q0 turns on, the currents $I_{L1}$ and $I_D$ flow through a channel of Vin (positive electrode)→L1→Q0→Vin (negative electrode).

Next, in a period TM2, when the switching element Q0 turns off, the currents $I_{L1}$ and $I_{D1}$ flow through a channel of Vin (positive electrode)→L1→D1→Co→Vin (negative electrode). Therefore, the drain-source voltage $V_{DS}$ of the switching element Q0 rises.

In the ON period TM1 of the switching element Q0, the current $I_{L1}$ flowing through the step-up reactor L1 changes with time at an inclination of Vin/L1. Specifically, the current $I_{L1}$ flowing through the step-up reactor L1 is the minimum immediately after the switching element Q0 turns on, and is the maximum immediately before the switching element Q0 turns off. Therefore, in the conventional DC-DC converter, a loss generated when the switching element Q0 turns off is larger than losses when the switching element Q0 turns on and remains on. In order to reduce the large loss caused when the switching element Q0 turns off, an inductance value of the step-up reactor L1 just needs to be set large, whereby the current flowing through the step-up reactor L1 when the switching element Q0 turns off just needs to be reduced.

However, when the inductance value of the step-up reactor L1 is set large, increases of an iron loss and copper loss of the step-up reactor L1 are brought about. Hence, in order not to allow the increase of either the iron loss or the copper loss, it is necessary to change the step-up reactor L1 to a larger-size one. Moreover, as a method of reducing the loss caused when the switching element Q0 turns off, it is also considered to raise a switching frequency of the switching element Q0. However, when the number of switching times increases, a switching loss also increases. Therefore, there is such a problem that heat generation of the switching element Q0 increases.

Moreover, when the inductance value of the step-up reactor L1 is set large or the switching frequency is set high, the current flowing through the step-up reactor L1 causes direct current superposition.

Then, the switching loss caused when the switching element Q0 turns on increases, and in addition, a surge current caused by a recovery current of the rectifier D1 flows through the switching element Q0. Therefore, large electric noise is generated.

Note that a DC-DC converter is known, which operates in synchronization with timing when the current flowing through the step-up reactor L1 becomes zero for the purpose of suppressing the surge current by the rectifier D1 (refer to Japanese Patent Application Laid-Open Publication No. 2000-78836 (Patent Publication 1)).

SUMMARY OF THE INVENTION

However, a technology of Patent Publication 1 cannot suppress the increase of the switching loss caused when the switching element Q0 turns on though can suppress the surge current generated by the rectifier D1.

It is an object of the present invention to provide a high efficiency and inexpensive DC-DC converter that reduces the switching loss.

In order to solve the above-described problem, a DC-DC converter according to a first aspect of the present invention includes: a first series circuit in which a resonance reactor, a primary winding of a transformer, and a switching element are connected in series, the first series circuit being connected to both ends of a direct current power supply; a second series circuit in which a first rectifier, a current resonance capacitor, and a secondary winding of the transformer are connected in series, the second series circuit being connected to both ends of the direct current power supply; a rectifying/smoothing circuit having a second rectifier and a smoothing capacitor and connected to both ends of a series circuit of the current resonance capacitor and the secondary winding of the transformer; an output voltage detection circuit for detecting an output voltage of the rectifying/smoothing circuit; and a control circuit that turns on and off the switching element based on an output voltage signal from the output voltage detection circuit.

Moreover, a DC-DC converter according to a second aspect of the present invention includes: a first series circuit in which a primary winding of a transformer and a switching element are connected in series, the first series circuit being connected to both ends of a direct current power supply; a second series circuit in which a first rectifier, a current resonance capacitor, a resonance reactor, and a secondary winding of the transformer are connected in series, the second series circuit being connected to both ends of the direct current power supply; a rectifying/smoothing circuit having a second rectifier and a smoothing capacitor and connected to both ends of a series circuit of the current resonance capacitor, the resonance reactor, and the secondary winding of the transformer; an output voltage detection circuit for detecting an output voltage of the rectifying/smoothing circuit; and a control circuit that turns on and off the switching element based on an output voltage signal from the output voltage detection circuit.

It is preferable that the DC-DC converter according to each of the aspects of the present invention further include: a third rectifier connected between a node between the primary winding of the transformer and the switching element and a node between the second rectifier and the smoothing capacitor.

Moreover, in the DC-DC converter according to each of the aspects of the present invention, the control circuit may adjust an ON duty of the switching element so that an error between the output voltage signal from the output voltage detection circuit and a reference voltage can become small, and when the ON duty becomes a predetermined value, may fix an ON time of the switching element, and may adjust an OFF time thereof.

At this time, it is preferable that the control circuit set the ON time of the switching element at a longer time than a half of a time period of a resonant current generated by the resonance reactor and the current resonance capacitor.

Moreover, alternatively, in the DC-DC converter according to each of the aspects of the present invention, the control circuit may fix an ON time of the switching element and may adjust an OFF time thereof so that an error between the output voltage signal from the output voltage detection circuit and a reference voltage can become small, and when an operation frequency of the switching element becomes a fixed value or more or the fixed value or less, may set the operation frequency at a fixed value, and may control an ON duty of the switching element.

At this time, it is preferable that the control circuit set the ON time of the switching element at a longer time than a half of a time period of a resonant current generated by the resonance reactor and the current resonance capacitor.

Moreover, in the DC-DC converter according to each of the aspects of the present invention, the resonance reactor may be a leakage inductance between the primary winding and secondary winding of the transformer.

In accordance with the DC-DC converter according to each of the aspects of the present invention, the resonant current flows by a series resonance of the resonance reactor and the current resonance capacitor, and this resonant current is used, and accordingly, the high efficiency and inexpensive DC-DC converter that reduces the switching loss can be provided.

DETAILED DESCRIPTION OF EMBODIMENTS

Figure 1:
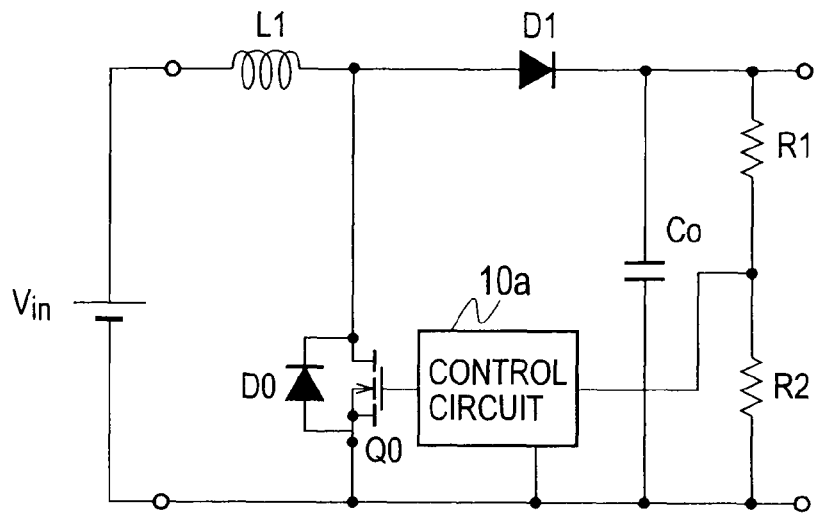
FIG. 1 is a circuit configuration diagram of a conventional DC-DC converter.
Figure 2:
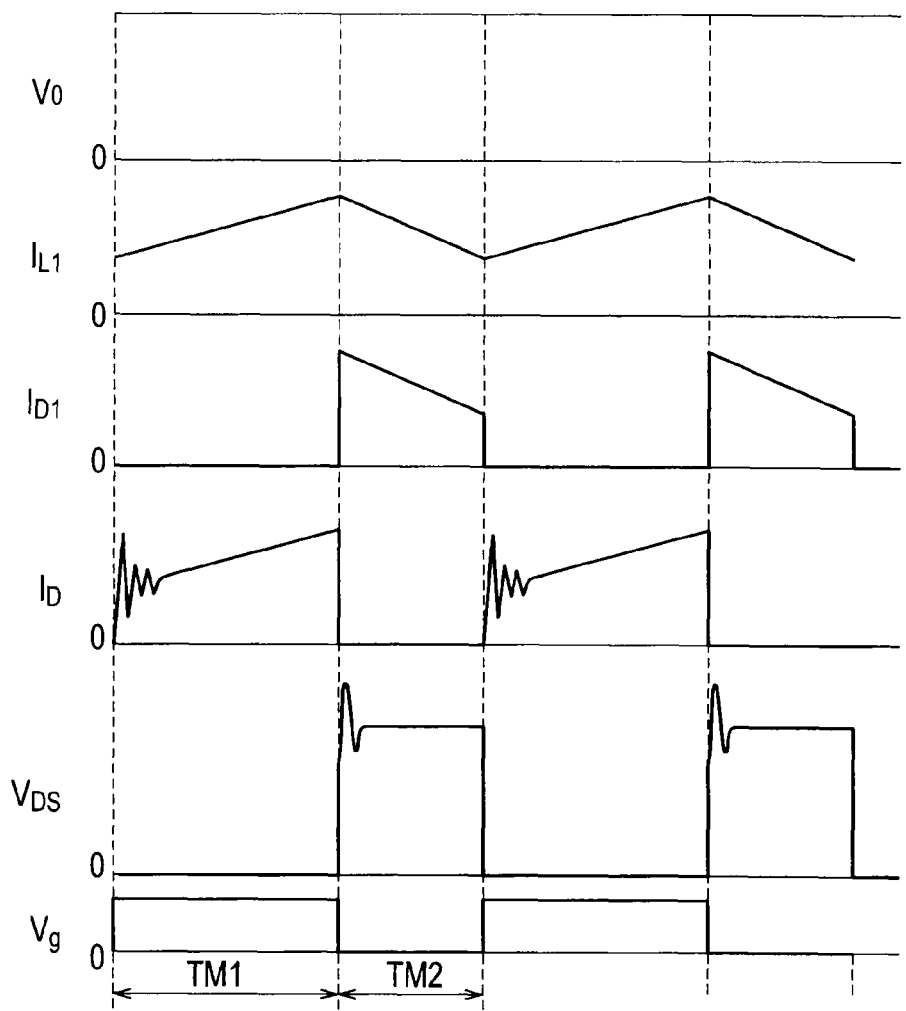
FIG. 2 is a chart showing operation waveforms of the respective portions of the conventional DC-DC converter shown in FIG. 1.

A description will be made below in detail of embodiments of a DC-DC converter of the present invention while referring to the drawings.

Embodiment 1

A description will be made of operations of a DC-DC converter of Embodiment 1 of the present invention by using FIG. 3 to FIG. 8.

Figure 3:
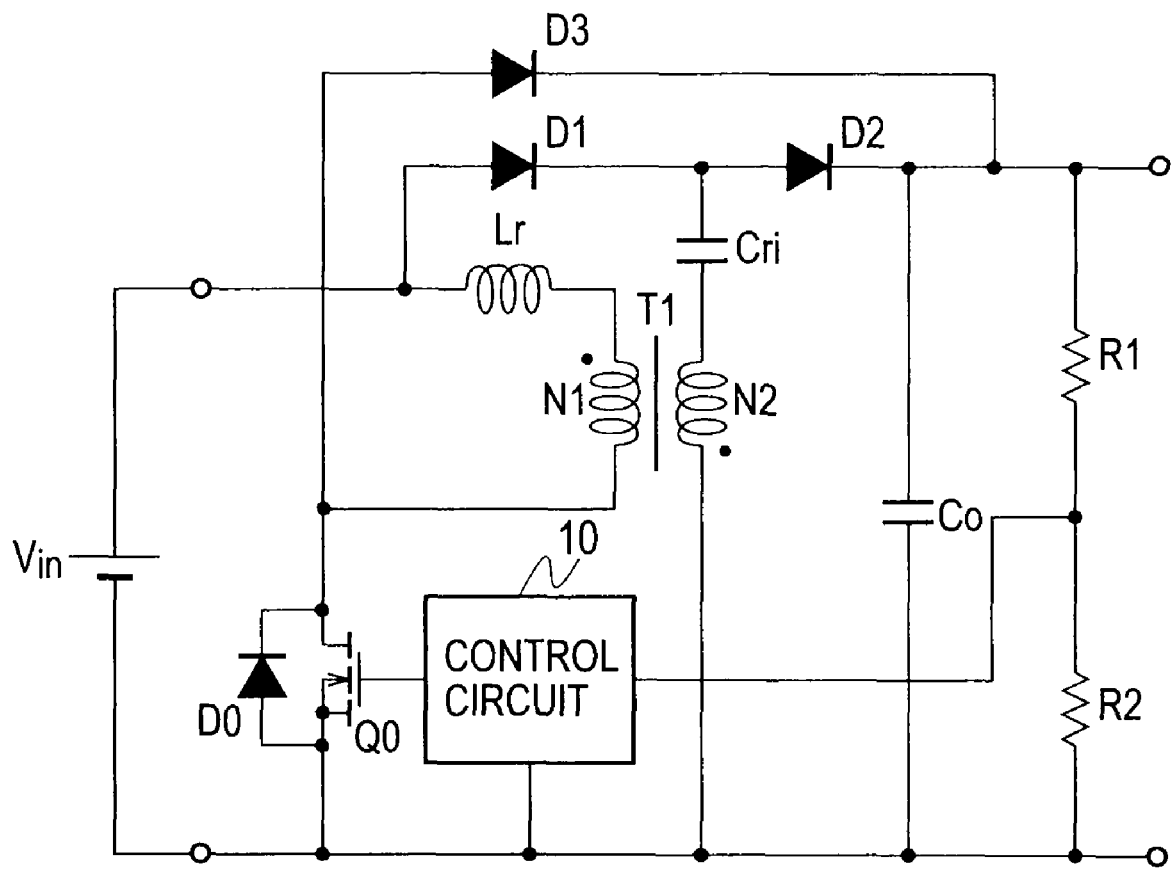
FIG. 3 is a circuit configuration diagram of a DC-DC converter of Embodiment 1 of the present invention.

In the DC-DC converter of Embodiment 1 of the present invention, which is shown in FIG. 3, a first series circuit composed of a resonance reactor Lr, a primary winding N1 of a transformer T1, and a switching element Q0 composed of a MOSFET or the like is connected to both ends of a direct current power supply Vin. A diode D0 is connected between a drain and a source of the switching element Q0. Note that the diode D0 may be a parasitic diode of the switching element Q0.

A second series circuit composed of a rectifier D1, a current resonance capacitor Cri, and a secondary winding N2 of the transformer T1 is further connected to both ends of the direct current power supply Vin. A rectifying/smoothing circuit composed of a rectifier D2 and a smoothing capacitor Co is connected in parallel to a series circuit of the current resonance capacitor Cri and the secondary winding N2 of the transformer T1. A rectifier D3 is connected between a node between the primary winding N1 of the transformer T1 and the switching element Q0 and a node between the rectifier D2 and the smoothing capacitor Co.

An output voltage detection circuit composed of a first resistor R1 and a second resistor R2, which are connected in series, is connected to both ends of the smoothing capacitor Co. A control circuit 10 turns on and off the switching element Q0 based on an output voltage signal subjected to voltage division by the first resistor R1 and the second resistor R2.

Figure 4:
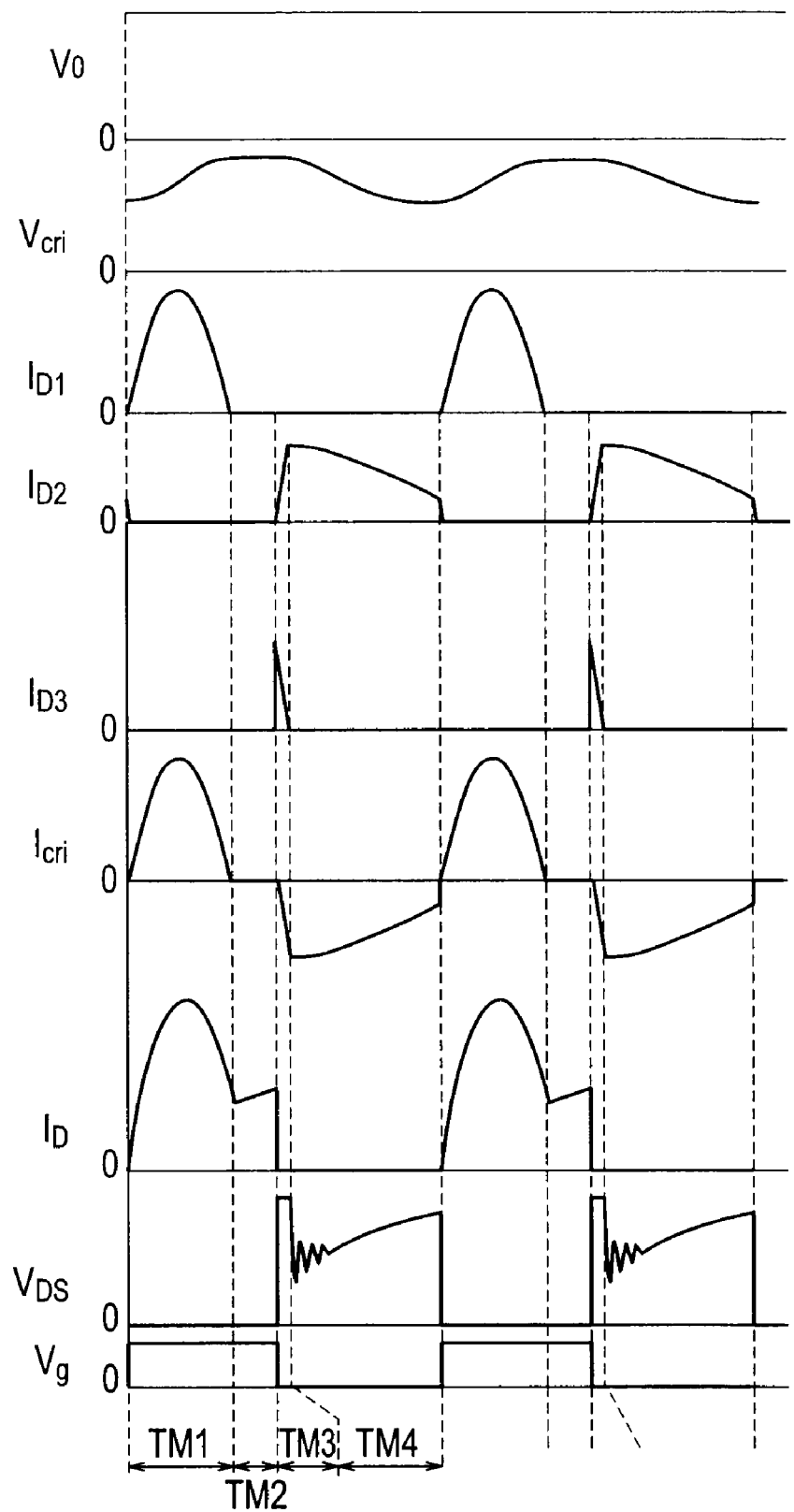
FIG. 4 is a chart of operation waveforms of the respective portions of the DC-DC converter of Embodiment 1 of the present invention.

In a chart of operation waveforms of the respective portions of the DC-DC converter of Embodiment 1 of the present invention, the chart being shown in FIG. 4, Vo indicates a both-end voltage of the smoothing capacitor Co, Vcri indicates a both-end voltage of the current resonance capacitor Cri, $I_{D1}$ indicates a current flowing through the rectifier D1, $I_{D2}$ indicates a current flowing through the rectifier D2, $I_{D3}$ indicates a current flowing through the rectifier D3, $I_{cri}$ indicates a current flowing through the current resonance capacitor Cri, $I_D$ indicates a drain current of the switching element Q0, $V_{DS}$ indicates a drain-source voltage of the switching element Q0, and Vg indicates a drive signal of the switching element Q0.

In Embodiment 1, as shown in FIG. 4, a switching operation of one cycle of the switching element Q0 is divided into periods from a first period TM1 to a fourth period TM4.

First, in the first period TM1, the control circuit 10 is outputting the drive signal Vg, whereby the switching element Q0 is in an ON state. At this time, a switching current flows as $I_D$ through a channel of Vin (positive electrode) →Lr→N1→Q0→Vin (negative electrode).

Moreover, at the same time as above, a resonant current $I_{cri}$ flows through a channel of Vin (positive electrode) →D1→Cri→N2→Vin (negative electrode). At this time, the switching current $I_D$ becomes a synthesized current of a resonant current component with a frequency determined by a series resonance of the resonance reactor Lr and the current resonance capacitor Cri, and of a linear current component having an inclination determined by an inductance value of the primary winding N1 of the transformer T1. As opposed to this, the resonant current $I_{cri}$ is only a resonant current component having a frequency determined by a series resonance of the resonance reactor Lr and the current resonance capacitor Cri. When the resonant current $I_{cri}$ becomes zero, the second period TM2 is started.

In the second period TM2, the control circuit 10 is outputting the drive signal Vg, and accordingly, the switching element Q0 is in the ON state continuing from the first period TM1. At this time, the switching current flows as $I_D$ through the channel of Vin (positive electrode)→Lr→N1→Q0→Vin (negative electrode).

However, unlike the first period TM1, the switching current $I_D$ becomes only a linear current component with the inclination determined by the inductance value of the primary winding N1 of the transformer T1. When the control circuit 10 turns off the drive signal Vg, the third period TM3 is started.

In the third period TM3, the switching element Q0 turns off, and magnetic flux energy accumulated in the transformer T1 generates counter-electromotive force in the primary winding N1 of the transformer T1. By this counter-electromotive force, the switching current flows as $I_{D3}$ through a channel of Vin (positive electrode) →Lr→N1→D3→Co→Vin (negative electrode). Moreover, at the same time as above, the resonant current $I_{cri}$ flows through a channel of N2→Cri→D2→Co→N2.

The switching current ID3 decreases from a value of the current that has flown through the primary winding N1 of the transformer T1 when the switching element Q0 turned off with an inclination substantially determined by the following expression, (both-end voltage of the smoothing capacitor Co—both-end voltage of the direct current power supply Vin–(both-end voltage of the smoothing capacitor Co–both-end voltage of the current resonance capacitor Cri)×number of turns of the primary winding N1 of the transformer T1/number of turns of the secondary winding N2 of the transformer T1)/inductance value of the resonance reactor Lr.

Meanwhile, the resonant current $I_{cri}$ increases from zero in the minus direction with an inclination substantially determined by the following expression, (both-end voltage of the smoothing capacitor Co–both-end voltage of the current resonance capacitor Cri)/(inductance value of the resonance reactor Lr×square of number of turns of the secondary winding N2 of the transformer T1/square of number of turns of the primary winding N1 of the transformer T1).

When the switching current $I_{D3}$ becomes zero, the fourth period TM4 is started.

In the fourth period TM4, the resonant current $I_{cri}$ flows through the channel of N2→Cri→D2→Co→N2. At this time, the resonant current $I_{cri}$ becomes a current with a frequency determined by a series resonant frequency of the current resonance capacitor Cri and the secondary winding N2 of the transformer T1. Subsequently, the control circuit 10 outputs the drive signal Vg, whereby the switching element Q0 turns to the ON state. Then, such a switching operation of the switching element Q0 returns to the first period TM1. As described above, a series of these operations is executed repeatedly.

Note that, in the case where load power is small, or depending on number of turns of the windings of the transformer T1, a fifth period while the resonant current $I_{cri}$ becomes zero is sometimes interposed in the period TM4.

Subsequently, a description will be made of operations of the control circuit 10 by using FIG. 5 to FIG. 8.

Figure 5:
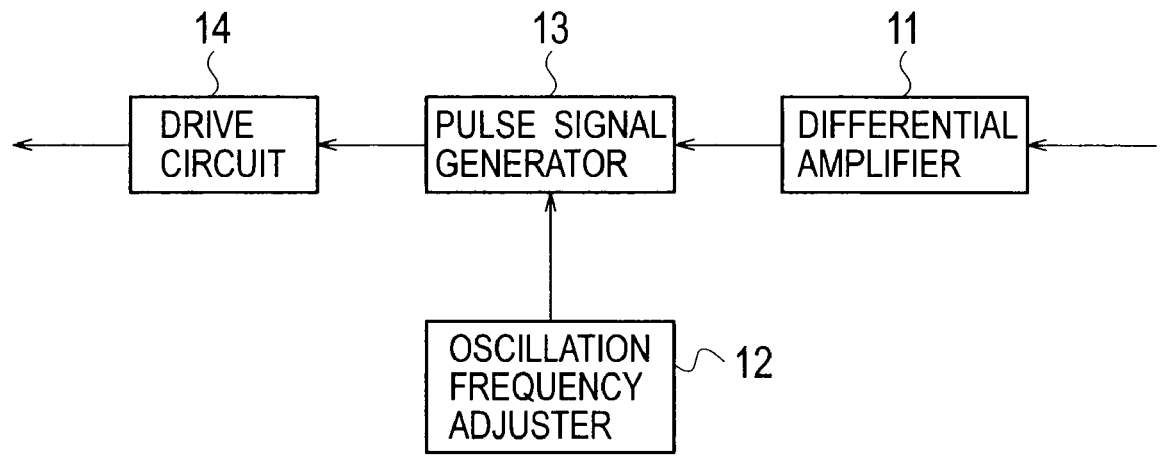
FIG. 5 is a configuration block diagram of a control circuit of Embodiment 1 of the present invention.

As shown in a configuration block diagram of FIG. 5, the control circuit 10 includes a differential amplifier 11, an oscillation frequency adjuster 12, a pulse signal generator 13, and a drive circuit 14.

The differential amplifier 11 receives the output voltage signal subjected to the voltage division by the first resistor R1 and the second resistor R2, and outputs a differential amplified signal obtained by amplifying an error between the output voltage signal subjected to the voltage division and a reference signal (not shown).

The pulse signal generator 13 generates a pulse string signal for driving the switching element Q0 by using the differential amplified signal inputted from the differential amplifier 11 and a frequency adjustment signal inputted from the oscillation frequency adjuster 12, and outputs the pulse string signal to the drive circuit 14. The drive circuit 14 outputs the drive signal for driving the switching element Q0 based on the pulse string signal inputted from the pulse signal generator 13.

Figure 6:
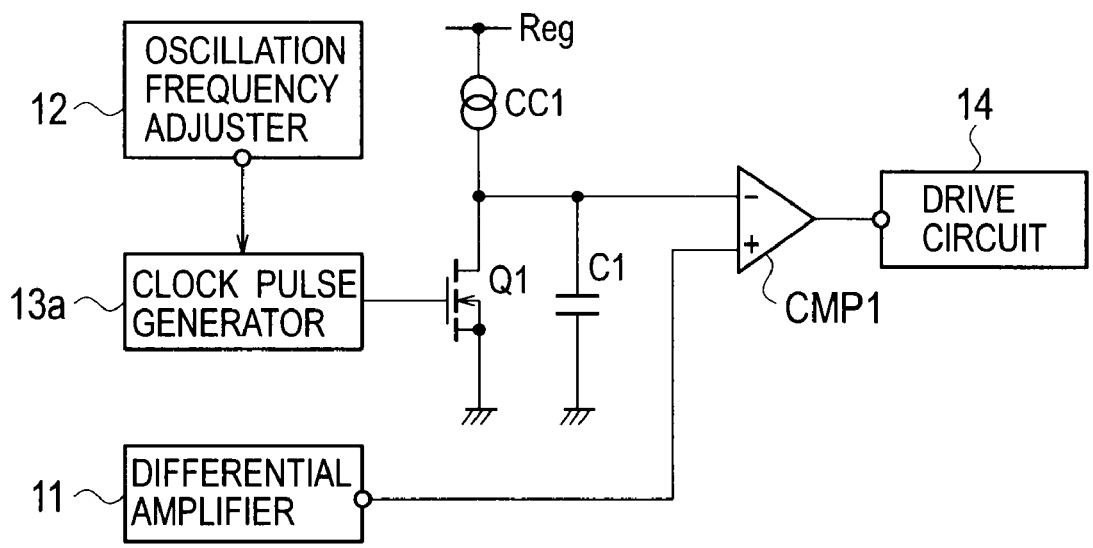
FIG. 6 is a configuration block diagram of a pulse signal generator provided in the control circuit of Embodiment 1 of the present invention.

In a configuration block diagram of the pulse signal generator 13, which is shown in FIG. 6, a series circuit of a constant current source CC1 and a capacitor C1 is connected between a power supply Reg and the ground. Moreover, a switching element Q1 composed of an N-type MOSFET is connected as a discharge circuit in parallel to the capacitor C1.

An inverting input terminal of a comparator CMP1 is connected to one end of the capacitor C1 and a node between a drain of the switching element Q1 and one end of the constant current source CC1. Moreover, a noninverting input terminal of the comparator CMP1 is connected to an output terminal of the differential amplifier 11. In such a way, the comparator CMP1 compares a both-end voltage of the capacitor C1 and the output signal of the differential amplifier 11 with each other. A clock pulse generator 13a generates a clock pulse based on the frequency adjustment signal inputted from the oscillation frequency adjuster 12. The switching element Q1 turns on and off in such a manner that the clock pulse from the clock pulse generator 13a is inputted to a gate terminal thereof.

Figure 7:
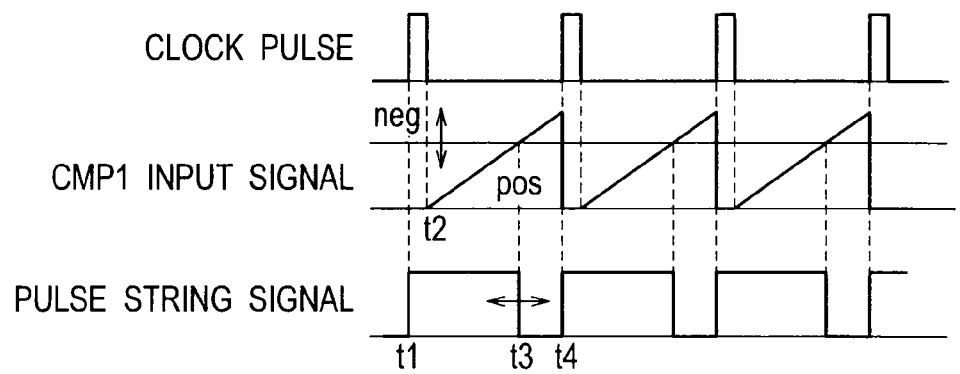
FIG. 7 is a chart of operation waveforms of the respective portions of the pulse signal generator shown in FIG. 6.

A description will be made of operations of the pulse signal generator 13 shown in FIG. 6 with reference to a chart of operation waveforms of the respective portions thereof, which is shown in FIG. 7. First, at a time t1, the switching element Q1 turns on by the clock pulse supplied from the clock pulse generator 13a. Then, the capacitor C1 discharges, whereby the both-end voltage of the capacitor C1 becomes substantially zero.

At a time t2, the switching element Q1 turns off by the clock pulse. Then, the capacitor C1 is charged by a current of the constant power source CC1. At this time, the comparator CMP1 compares the both-end voltage of the capacitor C1 that repeats the charge and the discharge by the clock pulse and a voltage of the differential amplified signal from the differential amplifier 11 with each other.

Then, the comparator CMP1 generates the pulse string signal, which rises to an H level (from time t2 to time t3) when the voltage of the differential amplified signal is higher than the both-end voltage of the capacitor C1, and drops to an L level (from time t3 to time t4) when the both-end voltage of the capacitor C1 is higher than the voltage of the differential amplified signal. In such a way, the pulse signal generator 13 shown in FIG. 6 generates a pulse string, in which an ON duty and an OFF duty are different from each other, in response to such a voltage level of the differential amplified signal.

Figure 8:
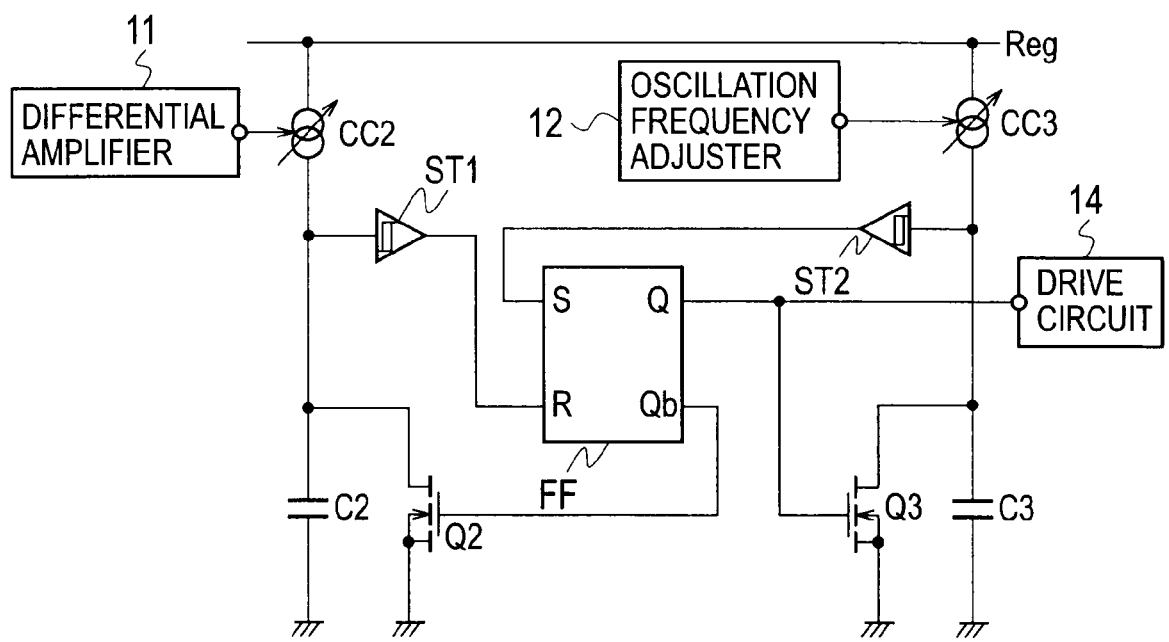
FIG. 8 is another configuration block diagram of the pulse signal generator provided in the control circuit of Embodiment 1 of the present invention.

FIG. 8 is a configuration block diagram of a pulse signal generator different in configuration from the pulse signal generator shown in FIG. 6.

In a configuration of the pulse signal generator 13 shown in FIG. 8, a series circuit of a variable constant current source CC2 and a capacitor C2 is connected between a power supply Reg and the ground. Moreover, a switching element Q2 composed of an N-type MOSFET is connected as a discharge circuit in parallel to the capacitor C2. Furthermore, a Schmitt buffer ST1 is connected to a node between the variable constant current source CC2 and the capacitor C2.

Moreover, a series circuit of a variable constant current source CC3 and a capacitor C3 is connected between the power supply Reg and the ground. Moreover, a switching element Q3 composed of an N-type MOSFET is connected as a discharge circuit in parallel to the capacitor C3. Moreover, a Schmitt buffer ST2 is connected to a node between the variable constant current source CC3 and the capacitor C3.

The variable constant current source CC2 changes a currentvalue thereof inproportion to a differential amplified signal of a differential amplifier 11. The variable constant current source CC3 changes a current value thereof in proportion to a frequency adjustment signal (ON-period setting signal) of the oscillation frequency adjuster 12.

A flip-flop FF connects the Schmitt buffer ST2 to a set input terminal S thereof, connects the Schmitt buffer ST1 to a reset input terminal R thereof, connects a drive circuit 14 and the switching element Q3 to an output terminal Q thereof, and connects the switching element Q2 to an inverting output terminal Qb thereof.

In the pulse signal generator 13 shown in FIG. 8, in a state where the flip-flop FF is set, the output terminal Q outputs a signal of the H level, and the inverting output terminal Qb outputs a signal of the L level. Then, the switching terminal Q3 turns on, whereby the capacitor C3 discharges. Moreover, the switching element Q2 turns off, whereby the capacitor C2 is charged by the variable constant current source CC2.

At this time, the pulse signal generator 13 is outputting an ON signal for the switching element Q0 to the drive circuit 14. Thereafter, a potential of the capacitor C2 rises by the charge by the variable constant current source CC2, and reaches a threshold voltage of the Schmitt buffer ST1. Then, the Schmitt buffer ST1 outputs a reset signal to the reset input terminal R of the flip-flop FF.

Then, when the flip-flop FF is reset, the output of the output terminal Q changes to the L level. Then, the switching element Q3 turns off, whereby the capacitor C3 is charged by the variable constant current source CC3. At the same time as above, the output of the inverting output terminal Qb changes to the H level. Then, the switching element Q2 turns on, whereby the capacitor C2 discharges.

At this time, the pulse signal generator 13 is outputting an OFF signal for the switching element Q0 to the drive circuit 14. Thereafter, a potential of the capacitor C3 rises by the charge by the variable constant current source CC3, and reaches a threshold voltage of the Schmitt buffer ST2. Then, the Schmitt buffer ST2 outputs a set signal to the set input terminal S of the flip-flop FF. In such a way, the output of the pulse signal generator 13 returns to an original state thereof. By repeating these operations, the pulse signal generator 13 generates the pulse string signal, and outputs the pulse string signal to the drive circuit 14.

Moreover, at this time, the output of the variable constant current source CC3 is made constant, and the output of the variable constant power source CC2 is changed by the differential amplified signal. In such a way, for the switching element Q0, control is realized, in which the ON period becomes constant, and the OFF period changes based on the differential amplified signal of the output voltage of the DC-DC converter.

As described above, in accordance with the DC-DC converter of Embodiment 1, the resonant current flows by the series resonance of the resonance reactor Lr and the current resonance capacitor Cri. Moreover, by using this resonant current, a forward current flowing when the switching element Q0 turns off becomes small. Specifically, a switching loss of the switching element Q0 is reduced.

Furthermore, the respective rectifiers D1 to D3 turn to a state of a zero current or a state where the current is restricted when the operations change from a forward bias to a reverse bias. Hence, there can be provided a resonance-type DC-DC converter that is high efficiency, low noise, and inexpensive.

Embodiment 2

A description will be made of operations of a DC-DC converter of Embodiment 2 of the present invention by using FIG. 9 and FIG. 10.

Figure 9:
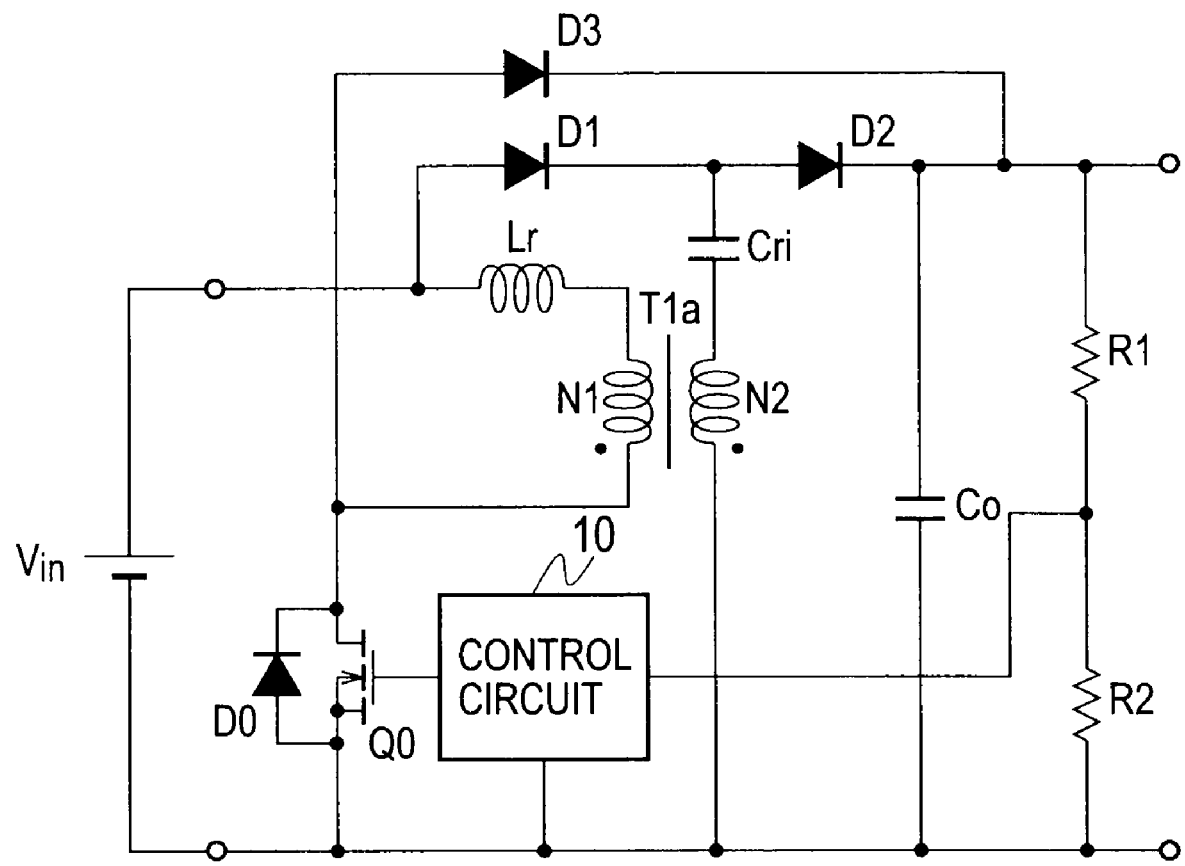
FIG. 9 is a circuit configuration diagram of a DC-DC converter of Embodiment 2 of the present invention.

In a circuit configuration of the DC-DC converter of Embodiment 2, which is shown in FIG. 9, a polarity of a primary winding N1 of a transformer T1a is inverted with respect to that of the primary winding N1 of the transformer T1 of the DC-DC converter of Embodiment 1, which is shown in FIG. 3. Other configurations are the same as the configurations shown in FIG. 3.

Figure 10:
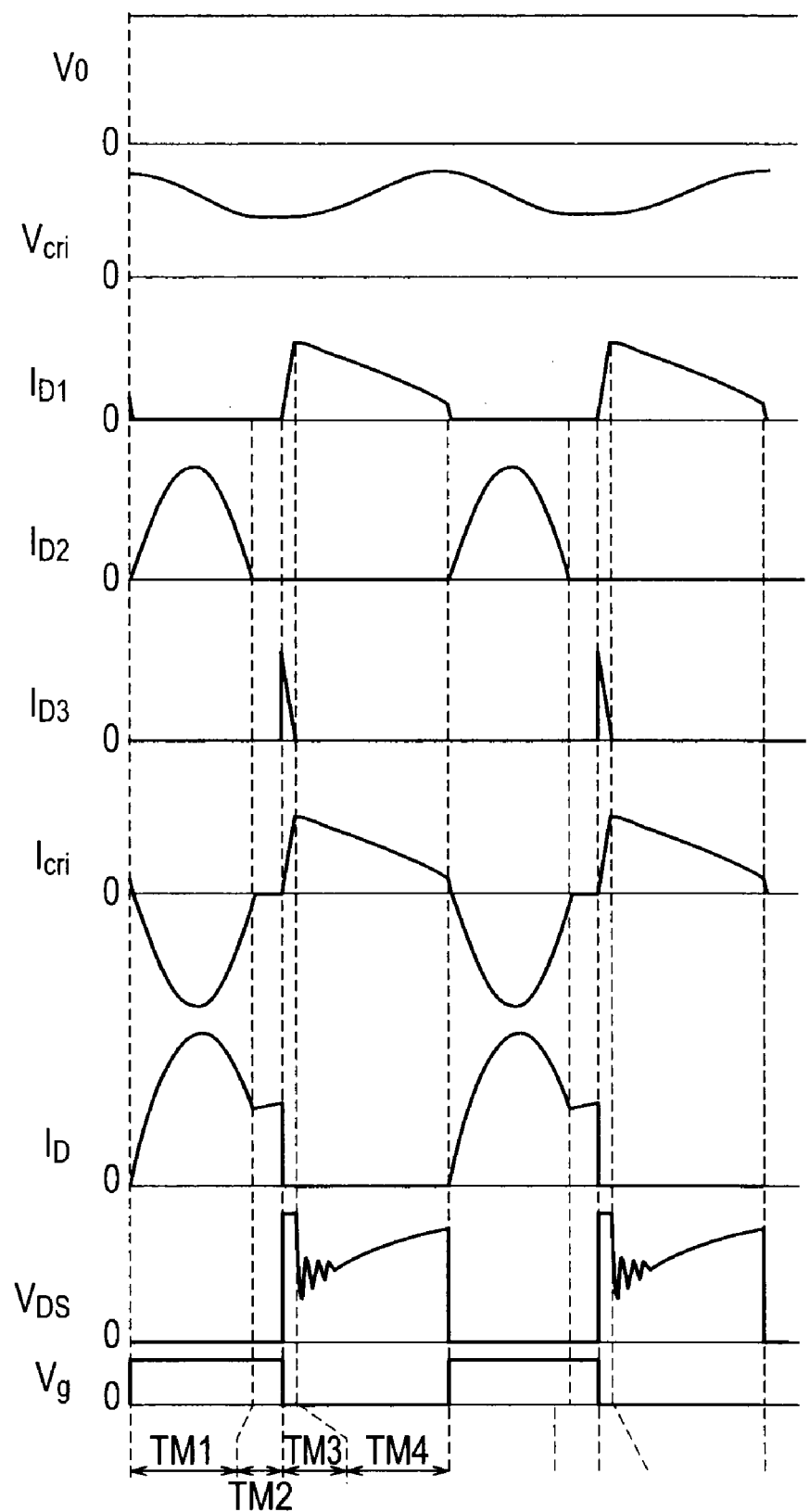
FIG. 10 is a chart of operation waveforms of the respective portions of the DC-DC converter of Embodiment 2 of the present invention.

Reference symbols in a chart of operation waveforms of the respective portions of the DC-DC converter of Embodiment 2, the chart being shown in FIG. 10, are the same as the reference symbols in the chart of the operation waveforms of the respective portions of the DC-DC converter of Embodiment 1, the chart being shown in FIG. 4. Hence, a description of the operation waveforms will be omitted here.

Also in Embodiment 2, as shown in FIG. 10, a switching operation of one cycle of a switching element Q0 is divided into periods from a first period TM1 to a fourth period TM4.

First, in the first period TM1, a control circuit 10 is outputting a drive signal Vg, whereby the switching element Q0 is in an ON state. At this time, a switching current flows as $I_D$ through a channel of Vin (positive electrode) →Lr→N1→Q0→Vin (negative electrode).

Moreover, at the same time as above, a resonant current $I_{cri}$ flows through a channel of N2→Cri→D2→Co→N2. The switching current $I_D$ becomes a synthesized current of a resonant current component with a frequency determined by a series resonance of the resonance reactor Lr and the current resonance capacitor Cri, and of a linear current component having an inclination determined by an inductance value of the primary winding N1 of the transformer T1a. The resonant current $I_{cri}$ is only a resonant current component having a frequency determined by a series resonance of the resonance reactor Lr and the current resonance capacitor Cri. When the resonant current $I_{cri}$ becomes zero, the second period TM2 is started.

In the second period TM2, the control circuit 10 is outputting the drive signal Vg, and accordingly, the switching element Q0 is in the ON state continuing from the first period TM1. At this time, the switching current flows as $I_D$ through the channel of Vin (positive electrode)→Lr→N1→Q0→Vin (negative electrode).

However, unlike the first period TM1, the switching current $I_D$ is only a linear current component with the inclination determined by the inductance value of the primary winding N1 of the transformer T1a. When the control unit 10 turns off the drive signal Vg, the third period TM3 is started.

In the third period TM3, the switching element Q0 turns off, whereby magnetic flux energy accumulated in the transformer T1a generates counter-electromotive force in the primary winding N1 of the transformer T1a. By this counter-electromotive force, the switching current flows as $I_{D3}$ through a channel of Vin (positive electrode) →Lr→N1→D3→Co→Vin (negative electrode). Moreover, at the same time as above, the resonant current $I_{cri}$ flows through a channel of Vin (positive electrode) →D1→Cri→N2→Vin (negative electrode).

The switching current $I_{D3}$ flown by the counter-electromotive force of the transformer T1a and the resonance reactor Lr decreases from a value of the current that has flown through the primary winding N1 of the transformer T1a when the switching element Q0 turned off with an inclination substantially determined by the following expression, (both-end voltage of the smoothing capacitor Co−both-end voltage of the direct current power supply Vin+(both-end voltage of the direct current power supply Vin−both-end voltage of the current resonance capacitor Cri)×number of turns of the primary winding N1 of the transformer T1a/number of turns of the secondary winding N2 of the transformer T1a)/inductance value of the resonance reactor Lr.

Meanwhile, the resonant current $I_{cri}$ increases from zero with an inclination substantially determined by the following expression, (both-end voltage of the direct current power supply Vin−both-end voltage of the current resonance capacitor Cri)/(inductance value of the resonance reactor Lr×square of number of turns of the secondary winding N2 of the transformer T1a/square of number of turns of the primary winding N1 of the transformer T1a).

When the switching current $I_{D3}$ becomes zero, the fourth period TM4 is started.

In the fourth period TM4, the resonant current $I_{cri}$ flows through the channel of Vin (positive electrode) →D1→Cri→N2→Vin (negative electrode). The resonant current $I_{cri}$ becomes a current with a frequency determined by a series resonant frequency of the current resonance capacitor Cri and the secondary winding N2 of the transformer T1a. Subsequently, the control circuit 10 outputs the drive signal Vg, whereby the switching element Q0 turns to the ON state. Then, such a switching operation of the switching element Q0 returns to the first period TM1. A series of these operations is executed repeatedly.

Note that, in the case where load power is small, or depending on number of turns of the windings of the transformer T1a, a fifth period while the resonant current $I_{cri}$ becomes zero is sometimes interposed in the period TM4.

Embodiment 3

Figure 11:
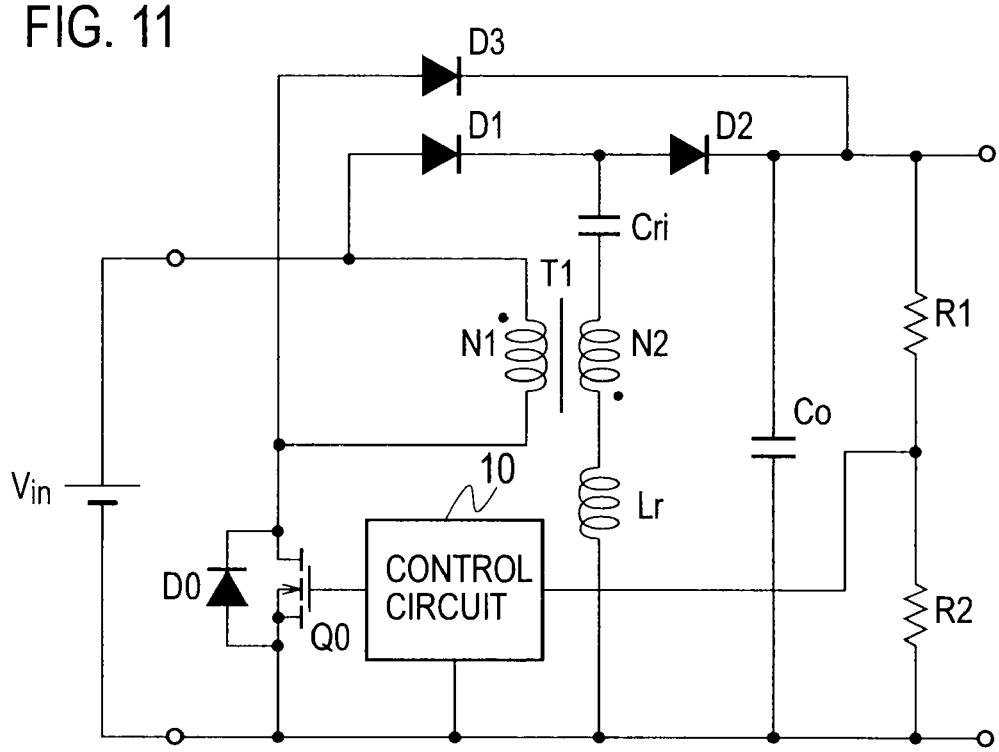
FIG. 11 is a circuit configuration diagram of a DC-DC converter of Embodiment 3 of the present invention.

A DC-DC converter of Embodiment 3 of the present invention, which is shown in FIG. 11, is different from the DC-DC converter of Embodiment 1, which is shown in FIG. 3, in that the resonance reactor Lr is connected in series to the series circuit of the current resonance capacitor Cri and the secondary winding N2 of the transformer T1. Other configurations are the same as the configurations shown in FIG. 3. Moreover, operations of Embodiment 3 are similar to the operations of Embodiment 1, and accordingly, a description thereof will be omitted.

Similar effects to the effects of Embodiment 1 can be obtained also by the DC-DC converter of Embodiment 3, which is as described above.

Embodiment 4

Figure 12:
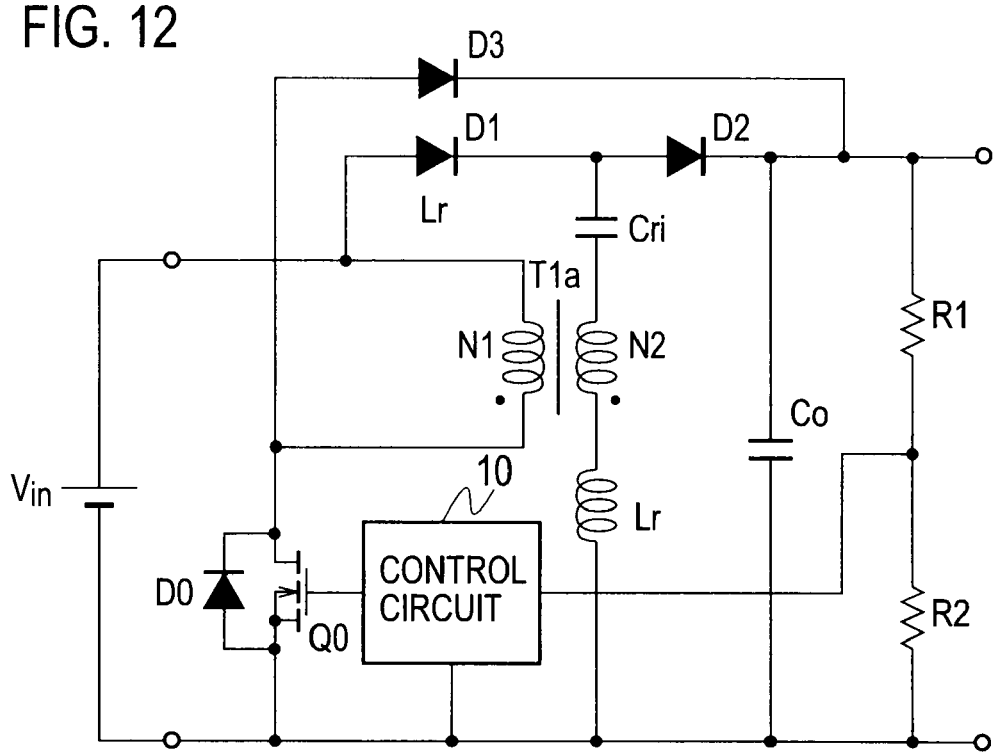
FIG. 12 is a circuit configuration diagram of a DC-DC converter of Embodiment 4 of the present invention.

A DC-DC converter of Embodiment 4 of the present invention, which is shown in FIG. 12, is different from the DC-DC converter of Embodiment 2, which is shown in FIG. 9, in that the resonance reactor Lr is connected in series to the series circuit of the current resonance capacitor Cri and the secondary winding N2 of the transformer T1a. Other configurations are the same as the configurations shown in FIG. 9. Moreover, operations of Embodiment 4 are similar to the operations of Embodiment 2, and accordingly, a description thereof will be omitted.

Similar effects to the effects of Embodiment 2 can be obtained also by the DC-DC converter of Embodiment 4, which is as described above.

Note that the present invention is not limited to the DC-DC converters from Embodiment 1 to Embodiment 4. The resonance reactor Lr may be, for example, a leakage inductance between the primary winding N1 and secondary winding N2 of the transformer T1.

Moreover, the control circuit 10 may adjust the ON duty of the switching element Q0 so that the error between such an output voltage signal Vo and the reference voltage can be small, and when the ON duty becomes a predetermined value, may fix the ON time of the switching element Q0, and may adjust the OFF time thereof.

Furthermore, the control circuit 10 may fix the ON time of the switching element Q0 and adjust the OFF time thereof so that the error between the output voltage signal Vo and the reference voltage can be small, and when an operation frequency of the switching element Q0 becomes a fixed value or more or the fixed value or less, may set the operation frequency at a fixed value, and may control the ON duty of the switching element Q0.

Furthermore, the control circuit may set the ON time of the switching element Q0 at a longer time than a half of a time period of the resonant current generated by the resonance reactor Lr and the current resonance capacitor Cri.

In this case, the switching element Q0 can be turned off after the resonant current by the resonance reactor Lr and the current resonance capacitor Cri becomes zero, and accordingly, the electric noise is generated less often.

What is claimed is:

1. A DC-DC converter, comprising:
    a first series circuit in which a resonance reactor, a primary winding of a transformer, and a switching element are connected in series, the first series circuit being connected to both ends of a direct current power supply;
    a second series circuit in which a first rectifier, a current resonance capacitor, and a secondary winding of the transformer are connected in series, the second series circuit being connected to both ends of the direct current power supply;
    a rectifying/smoothing circuit having a second rectifier and a smoothing capacitor and connected to both ends of a series circuit of the current resonance capacitor and the secondary winding of the transformer;
    an output voltage detection circuit for detecting an output voltage of the rectifying/smoothing circuit; and
    a control circuit that turns on and off the switching element based on an output voltage signal from the output voltage detection circuit.

2. The DC-DC converter according to claim 1, further comprising:
    a third rectifier connected between a node between the primary winding of the transformer and the switching element and a node between the second rectifier and the smoothing capacitor.

3. The DC-DC converter according to claim 1,
    wherein the control circuit adjusts an ON duty of the switching element so that an error between the output voltage signal from the output voltage detection circuit and a reference voltage can become small, and when the ON duty becomes a predetermined value, fixes an ON time of the switching element, and adjusts an OFF time thereof.

4. The DC-DC converter according to claim 3, wherein the control circuit sets the ON time of the switching element at a longer time than a half of a time period of a resonant current generated by the resonance reactor and the current resonance capacitor.

5. The DC-DC converter according to claim 1, wherein the control circuit fixes an ON time of the switching element and adjust an OFF time thereof so that an error between the output voltage signal from the output voltage detection circuit and a reference voltage can become small, and when an operation frequency of the switching element becomes a fixed value or more or the fixed value or less, sets the operation frequency at a fixed value, and controls an ON duty of the switching element.

6. The DC-DC converter according to claim 5, wherein the control circuit sets the ON time of the switching element at a longer time than a half of a time period of a resonant current generated by the resonance reactor and the current resonance capacitor.

7. The DC-DC converter according to claim 1, wherein the resonance reactor is a leakage inductance between the primary winding and the secondary winding of the transformer.

8. A DC-DC converter, comprising:
a first series circuit in which a primary winding of a transformer and a switching element are connected in series, the first series circuit being connected to both ends of a direct current power supply;
a second series circuit in which a first rectifier, a current resonance capacitor, a resonance reactor, and a secondary winding of the transformer are connected in series, the second series circuit being connected to both ends of the direct current power supply;
a rectifying/smoothing circuit having a second rectifier and a smoothing capacitor and connected to both ends of a series circuit of the current resonance capacitor, the resonance reactor, and the secondary winding of the transformer;
an output voltage detection circuit for detecting an output voltage of the rectifying/smoothing circuit; and
a control circuit that turns on and off the switching element based on an output voltage signal from the output voltage detection circuit.

9. The DC-DC converter according to claim 8, further comprising:
a third rectifier connected between a node between the primary winding of the transformer and the switching element and a node between the second rectifier and the smoothing capacitor.

10. The DC-DC converter according to claim 8, wherein the control circuit adjusts an ON duty of the switching element so that an error between the output voltage signal from the output voltage detection circuit and a reference voltage can become small, and when the ON duty becomes a predetermined value, fixes an ON time of the switching element, and adjusts an OFF time thereof.

11. The DC-DC converter according to claim 10, wherein the control circuit sets the ON time of the switching element at a longer time than a half of a time period of a resonant current generated by the resonance reactor and the current resonance capacitor.

12. The DC-DC converter according to claim 8, wherein the control circuit fixes an ON time of the switching element and adjust an OFF time thereof so that an error between the output voltage signal from the output voltage detection circuit and a reference voltage can become small, and when an operation frequency of the switching element becomes a fixed value or more or the fixed value or less, sets the operation frequency at a fixed value, and controls an ON duty of the switching element.

13. The DC-DC converter according to claim 12, wherein the control circuit sets the ON time of the switching element at a longer time than a half of a time period of a resonant current generated by the resonance reactor and the current resonance capacitor.

14. The DC-DC converter according to claim 8, wherein the resonance reactor is a leakage inductance between the primary winding and the secondary winding of the transformer.

* * * * *